(12) United States Patent
Morissette et al.

(10) Patent No.: US 11,125,375 B2
(45) Date of Patent: Sep. 21, 2021

(54) TUBULAR LINER FOR REHABILITATING UNDERGROUND AND SURFACE PIPES AND PIPELINES

(71) Applicants: Sanexen Environmental Services Inc., Brossard (CA); Niedner Inc., Coaticook (CA)

(72) Inventors: Sylvain Morissette, Sherbrooke (CA); Martin Bureau, Montréal (CA); Sylvain Boissonneault, Varennes (CA); Joël Héraud, Sherbrooke (CA); Dave Lord, Compton (CA); Pascal Michaud, St-Hermenegilde (CA); Gilles Gagnon, Repentigny (CA)

(73) Assignees: SANEXEN ENVIRONMENTAL SERVICES INC.; NIEDNER INC.

( * ) Notice: Subject to any disclaimer, the term of this patent is extended or adjusted under 35 U.S.C. 154(b) by 0 days.

(21) Appl. No.: 15/198,466

(22) Filed: Jun. 30, 2016

(65) Prior Publication Data
US 2018/0003331 A1 Jan. 4, 2018

(51) Int. Cl.
*F16L 55/163* (2006.01)
*F16L 55/165* (2006.01)
(Continued)

(52) U.S. Cl.
CPC ............ *F16L 55/1655* (2013.01); *B32B 1/08* (2013.01); *B32B 3/08* (2013.01); *B32B 5/024* (2013.01); *B32B 5/26* (2013.01); *B32B 13/06* (2013.01); *B32B 15/085* (2013.01); *B32B 15/088* (2013.01); *B32B 15/09* (2013.01);
*B32B 15/092* (2013.01); *B32B 15/095* (2013.01); *B32B 15/14* (2013.01); *B32B 15/18* (2013.01);
(Continued)

(58) Field of Classification Search
USPC .......... 405/184.1, 184.2, 184.5; 138/97, 98; 264/269
See application file for complete search history.

(56) References Cited

U.S. PATENT DOCUMENTS

| 4,576,205 | A | 3/1986 | Morinaga et al. |
| 6,923,217 | B2 * | 8/2005 | Smith ................. F16L 55/1651 138/124 |

(Continued)

FOREIGN PATENT DOCUMENTS

| EP | 0646060 B1 | 5/1999 |
| EP | 2839947 A1 | 2/2015 |
| WO | 03038331 A1 | 5/2003 |

OTHER PUBLICATIONS https://en.wikipedia.org/wiki/Staple_(textiles).*
(Continued)

*Primary Examiner* — Sean D Andrish
(74) *Attorney, Agent, or Firm* — Lavery, De Billy, LLP; Gwendoline Bruneau

(57) ABSTRACT

A seamless tubular liner for repairing an underground or surface pipe is disclosed, including circumferential wefts consisting of slivers comprising a plurality of staple fibers bundled together, the slivers adapted to elongate through disentanglement of the bundled staple fibers when the seamless tubular liner is subjected to an inflation pressure such that the diameter of the tubular liner is able to expand to accommodate variations of diameter of the pipe being repaired.

8 Claims, 4 Drawing Sheets

(51) Int. Cl.

| | | |
|---|---|---|
| *B32B 27/34* | (2006.01) | |
| *B32B 27/38* | (2006.01) | |
| *B32B 1/08* | (2006.01) | |
| *B32B 5/26* | (2006.01) | |
| *B32B 15/09* | (2006.01) | |
| *B32B 27/08* | (2006.01) | |
| *B32B 27/30* | (2006.01) | |
| *B32B 15/14* | (2006.01) | |
| *B32B 15/18* | (2006.01) | |
| *B32B 15/088* | (2006.01) | |
| *B32B 15/095* | (2006.01) | |
| *B32B 19/04* | (2006.01) | |
| *B32B 15/092* | (2006.01) | |
| *B32B 3/08* | (2006.01) | |
| *B32B 27/40* | (2006.01) | |
| *B32B 27/36* | (2006.01) | |
| *B32B 13/06* | (2006.01) | |
| *B32B 5/02* | (2006.01) | |
| *B32B 27/32* | (2006.01) | |
| *B32B 15/085* | (2006.01) | |
| *F16L 58/04* | (2006.01) | |

(52) U.S. Cl.
CPC ............ *B32B 19/04* (2013.01); *B32B 19/041* (2013.01); *B32B 27/08* (2013.01); *B32B 27/30* (2013.01); *B32B 27/304* (2013.01); *B32B 27/32* (2013.01); *B32B 27/34* (2013.01); *B32B 27/36* (2013.01); *B32B 27/38* (2013.01); *B32B 27/40* (2013.01); *F16L 55/165* (2013.01); *F16L 55/1656* (2013.01); *F16L 58/04* (2013.01); *B32B 2260/021* (2013.01); *B32B 2260/046* (2013.01); *B32B 2262/0253* (2013.01); *B32B 2262/0261* (2013.01); *B32B 2262/0269* (2013.01); *B32B 2262/0276* (2013.01); *B32B 2262/062* (2013.01); *B32B 2262/065* (2013.01); *B32B 2262/101* (2013.01); *B32B 2262/106* (2013.01); *B32B 2307/54* (2013.01); *B32B 2307/546* (2013.01); *B32B 2307/7265* (2013.01); *B32B 2597/00* (2013.01)

(56) References Cited

U.S. PATENT DOCUMENTS

| | | | |
|---|---|---|---|
| 8,616,243 B2 | 12/2013 | Kiest, Jr. | |
| 2006/0228501 A1* | 10/2006 | Daveloose | F16L 55/1656 428/35.7 |
| 2010/0088805 A1* | 4/2010 | Scherbel | A41D 27/06 2/255 |
| 2011/0030830 A1* | 2/2011 | McKaigue | F16L 41/10 138/98 |
| 2014/0030454 A1 | 1/2014 | Zuegel | |
| 2017/0082220 A1* | 3/2017 | Free | F16L 55/1651 |

OTHER PUBLICATIONS http://www.merriam-webster.com/dictionary/sliver.*
https://www.thefreedictionary.com/yarn.*
Search Report for corresponding United Kingdom Application No. 1710489.4 dated Dec. 14, 2017.

* cited by examiner

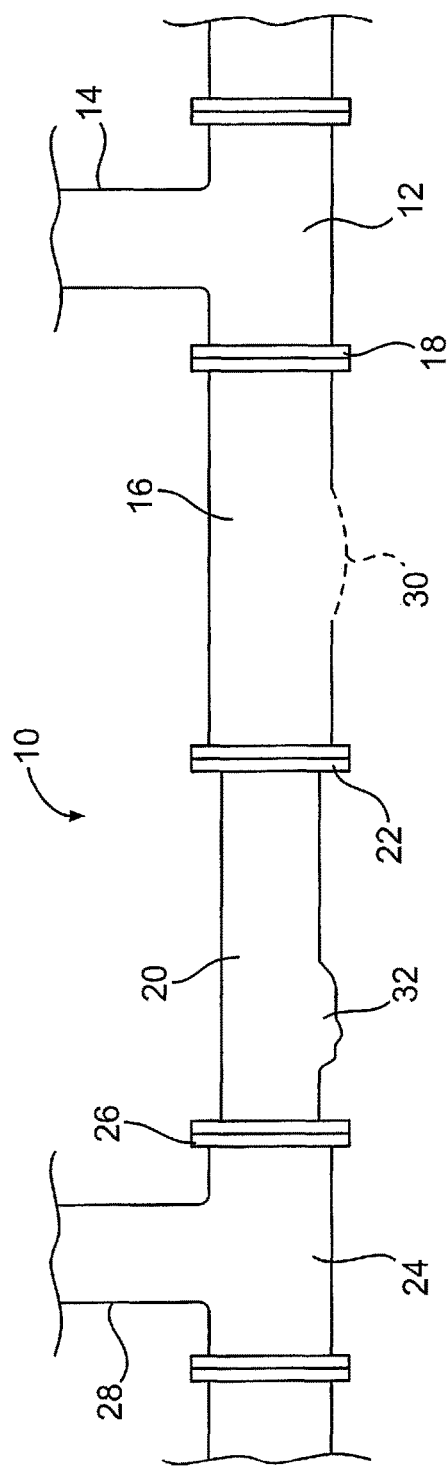
*FIG. 1*
*PRIOR ART*
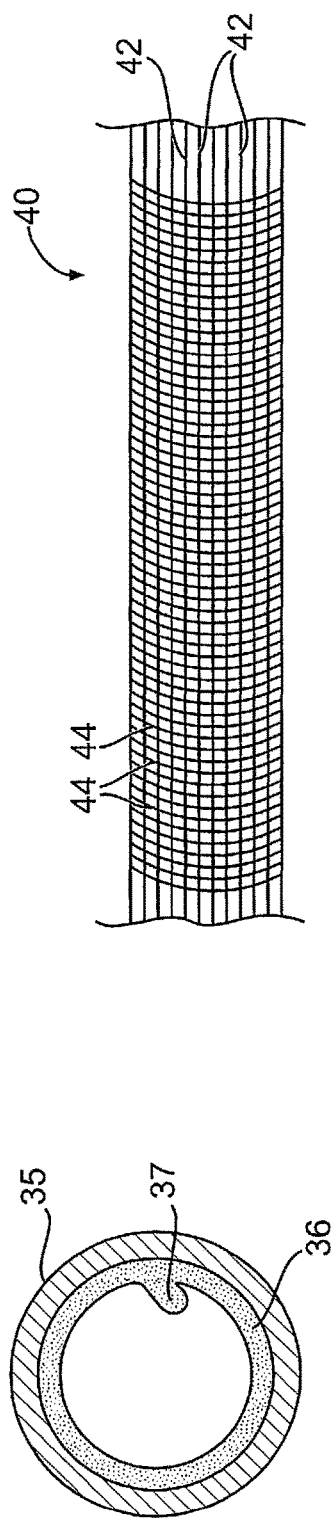
*FIG. 3*
*FIG. 2*
*PRIOR ART*

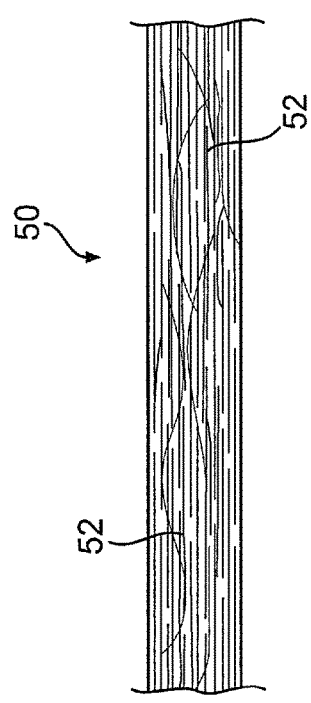
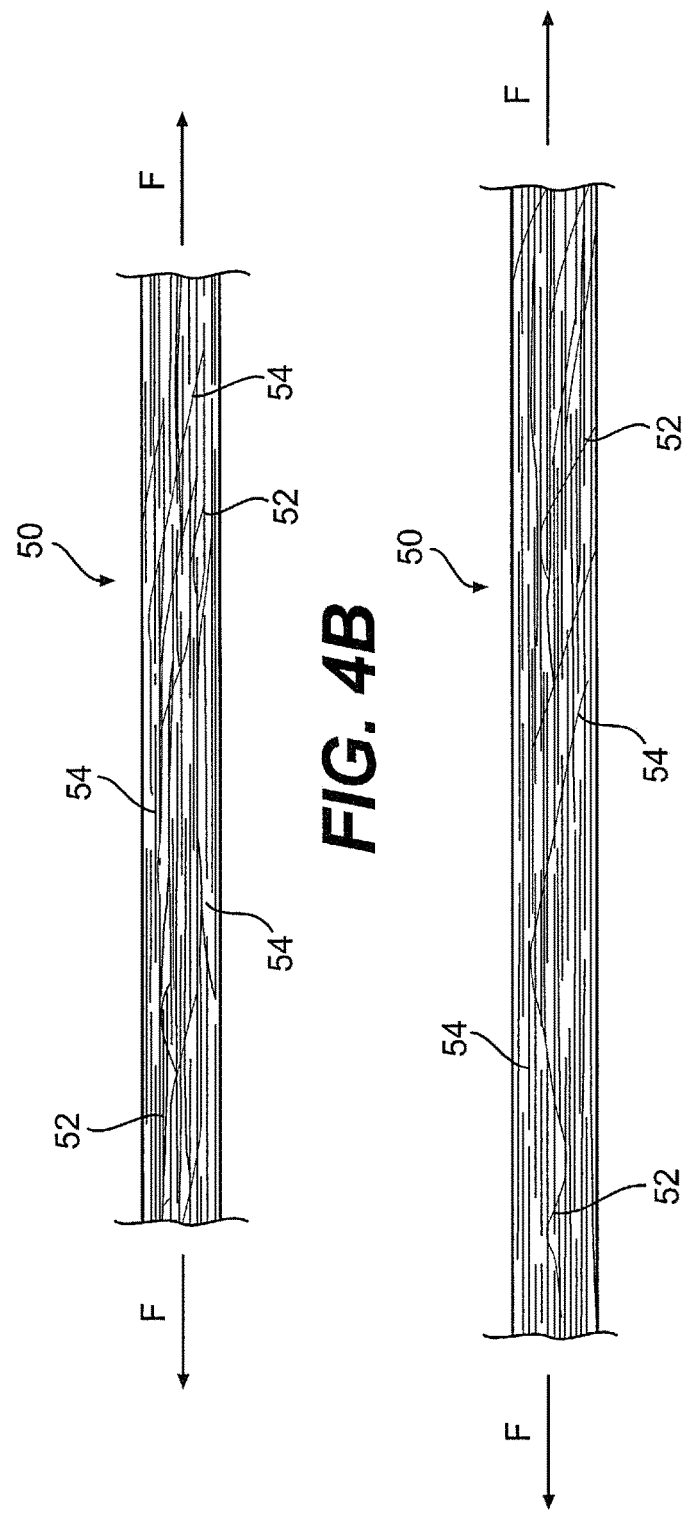
FIG. 4A
FIG. 4B
FIG. 4C

TUBULAR LINER FOR REHABILITATING UNDERGROUND AND SURFACE PIPES AND PIPELINES

FIELD OF THE INVENTION

The present invention relates to a reinforced tubular liner for rehabilitating a damaged or deteriorated underground or surface pipe and pipelines adapted for insertion into an existing pipe and more specifically to a seamless woven tubular liner that is radially stretchable to accommodate variations in the diameter of the existing pipe during the liner conformation phase and that meets all structural requirements for rehabilitation liner at the end of installation.

BACKGROUND OF THE INVENTION

Underground and surface pipes, either potable water pipes, waste water pipes or sewer pipes, are typically made of rigid materials such as reinforced concrete, cast iron, ductile iron, steel and hard polymers such as PVC, high-density polyethylene HDPE, etc., that are durable and adapted to resist internal fluid pressure and the external pressure of the weight of the soil above them. Underground and surface pipes networks provide essential services to homes and businesses and have been deployed in cities, towns and villages for more than a century. Buried and surface pipes connected together in a network extends over long distances, spreads out in all directions to provide services to residential homes or businesses over a wide area. Underground and surface pipes are subject to normal wear and degradation over extended periods of time due to cyclical loads, earth movements, corrosion, increased porosity, cracks and overall deterioration. As a result of their long service life, underground and surface pipes will become damaged and require repair or replacement.

Replacement of damaged sections or portions of a pipe network is an expensive, disruptive and time-consuming operation requiring heavy equipment for accessing, removal and replacement and is avoided as much as possible. For many years now, technologies have been developed and used to rehabilitate damaged water and sewage pipes instead of replacement. The various technologies basically consist in re-lining the inner walls of existing pipes with a flexible tubular liner impregnated with a curable resin which after insertion is pressurized to press the liner against the inner wall of the damaged pipe and cured in place to form a rigid structural lining inside the pipe. This technique is called Cured In Place Pipe or CIPP.

The tubular liner is typically a flat textile material or felt material which is rolled into tubular form and stitched along its seam or a seamless tubular textile jacket made of warps and wefts woven into tubular form. Felt materials are seldom used today because of their weak strength and limited capacity to provide structural reinforcement to the underground pipe or surface pipe to be repaired. Textile materials rolled into tubular form provide better structural reinforcement to the underground pipe to be repaired with the use of continuous fibers. However the seam of this flat material is the weak portion of the tubular liner and the stitching often breaks under various loads thereby ripping the tubular liner at its seam and creating gaps which render the rehabilitation of the underground or surface pipe ineffective. A seamless tubular textile jacket provides a most effective reinforcement for the pipes to be repaired precisely because it has no seam that can be torn apart. Furthermore, the inherent strength of the seamless tubular liner makes it easy to handle and insert into the underground or surface pipe as it can be pulled in place without possibility of being ripped apart under load.

In each case, the tubular liner has a fixed diameter which is slightly bigger than the diameter of the pipeline to be repaired to insure that tubular liner will rest firmly against the inner wall of the damaged pipe when cured in place inside the damaged pipe. One drawback of the larger diameter of the tubular liner is that the excess textile material may form a bulge or fold extending along the length of the pipeline which further reduces the effective diameter of the pipeline being repaired and also marginally obstructs the dynamic flow of liquid in the pipeline (see FIG. 2).

A second drawback to the tubular liner having a fixed diameter is that if and when the damaged pipe to be repaired includes variations in its diameter due to inaccuracy during construction or subsequent wear and degradation, the tubular liner is unable to stretch in the radial direction to accommodate the variations of diameter if the diameter of the host pipe exceeds the maximum outer diameter of the tubular liner. Tubular liners made of felt material rolled into tubular form are able to stretch due to their discontinuous fiber arrangement. However this type of liner provides little structural reinforcement to the host pipe.

U.S. Pat. No. 6,923,217 discloses a tubular liner comprising a textile material which is rolled into tubular form with a substantial overlap wherein the overlapping ends of the textile material are free to slide relative to each other when pressure is applied inside the tubular liner thereby allowing an expansion of the diameter of the tubular liner in order to accommodate variations in the circumference or diameter of the host pipe. In a variant, the overlapping ends of the textile material are sewn together with a weak thread that will break under the influence of the inflation pressure to allow the overlapping ends to slide relative to each other. This approach exploits the weakness of tubular liner made of textile material rolled into tubular form to allow expansion of the diameter of the tubular liner to accommodate variations in the diameter of the host pipe. However, the weakness of this type of tubular liner, due to the discontinuity in the textile material along the circumference of the roll, remains and there is an obvious waste of material in this approach.

U.S. Pat. Nos. 4,576,205 and 8,616,243 both disclose a seamless tubular liner made of warps and wefts woven into tubular form wherein the wefts (in the radial direction) consist of elastic yarns that can expand under the inflation pressure thereby allowing an expansion of the diameter of the seamless tubular liner to accommodate variations in the circumference or diameter of the host pipe. The drawback of this design is three-fold. First, an elastic yarn is difficult to process in a circular loom as the elastic yarn expands under the pulling force of the shuttle and causes variations in the diameter of the tubular liner itself. Compounded to this drawback, once installed into an pipe, in order to stretch the elastic weft of the tubular liner to expand the diameter of the tubular liner to conform to the variation of diameter of the host pipe, the inflation pressure must be maintained until the resin is completely cured and hardened otherwise the tubular liner will return to its initial diameter under the force of the elastic yarn. Finally, such elastic yarns are non-rigid by nature, resulting in low stiffness of the tubular structure in the circumferential direction.

International patent application No WO03038331 describes a tubular liner including a fabric material rolled into tubular form having longitudinal and radial fibers. The radial fibers comprise chopped fiber rovings or tows in substantially parallel alignment for being positioned substantially about the circumference of a host pipe, so the fabric can be elongated in a radial direction in order to accommodate variations in the circumference or diameter of the host pipe. The use of chopped fiber rovings or tows in the radial direction is limited to textile material rolled into tubular form. This approach is therefore limited to rolled tubular liner with its inherent weakness at the seam.

Thus, there is a need for a seamless tubular liner for rehabilitating and reinforcing underground or surface pipes that can expand in the radial direction to accommodate variations in the diameter of the host underground or surface pipe to be repaired which is easy to manufacture, install and cure in place and provides structural rehabilitation to the host pipes.

SUMMARY OF THE INVENTION

It is an object of the present invention to ameliorate at least some of the inconveniences present in the prior art.

In one aspect, the invention provides a seamless tubular liner for repairing an underground or surface pipe, the tubular liner having a diameter and comprising a circular woven sheath including longitudinal warps consisting of filament yarns extending along a longitudinal axis of the tubular liner and circumferential wefts consisting of slivers oriented substantially perpendicular to the longitudinal warps, the slivers comprising a plurality of staple fibers bundled together to form a continuous strand, the slivers adapted to elongate through disentanglement of the bundled staple fibers when the tubular liner is subjected to an inflation pressure such that the diameter of the tubular liner is able to expand to accommodate variations of diameter of the underground or surface pipe being repaired.

In an additional aspect, the invention provides a seamless tubular liner impregnated with a curable resin wherein the diameter of the tubular liner expands once the tubular liner is wetted with the curable resin.

In an additional aspect, the invention provides a seamless tubular liner comprising a second internal liner consisting of a second circular woven sheath identical to the first circular woven sheath.

In an additional aspect, the invention provides a seamless tubular liner further comprises an internal liner consisting of a water tight membrane.

In particular, a plurality of the staple fibers remains partially entangled together once the slivers are elongated such that the slivers remain a continuous strand.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 1 is a schematic side elevational view of a typical older network of network of underground pipes;

FIG. 2 is a schematic cross-sectional view of an exemplary pipe segment in which a prior art seamless tubular liner was installed;

FIG. 3 is a schematic view of a portion of a seamless tubular liner in accordance with one embodiment of the invention;

FIG. 4a is a schematic view of a first embodiment of a sliver consisting of staple fibers bundled together and forming the circumferential weft of the seamless tubular liner shown in FIG. 3;

FIGS. 4b and 4c are schematic views showing the sliver of FIG. 4a of the circumferential weft stretching and elongating;

DETAILED DESCRIPTION OF THE PREFERRED EMBODIMENTS

Figure 5A:
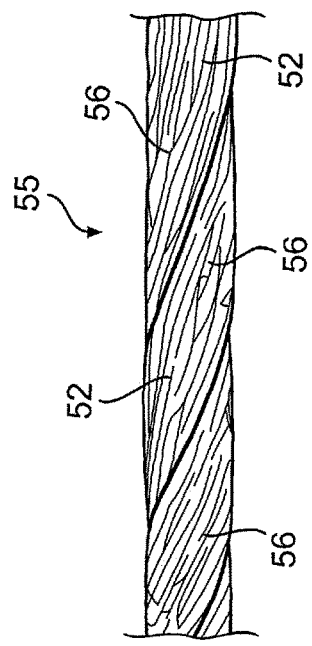
FIG. 5a is a schematic view of a second embodiment of a sliver consisting of staple fibers bundled together with a twist and forming the circumferential weft of the seamless tubular liner shown in FIG. 3.
Figure 5B:
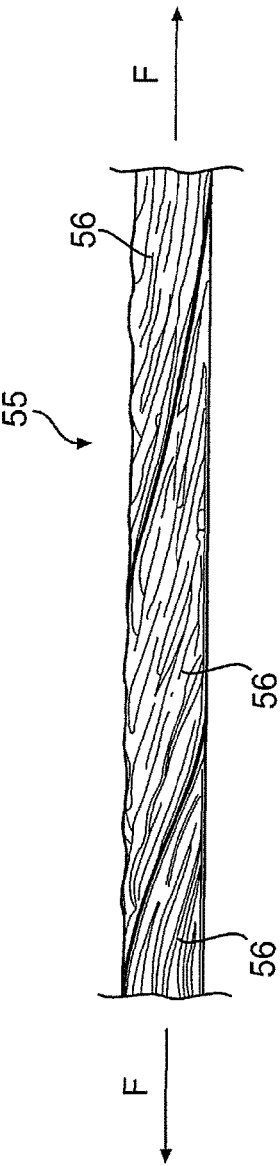
FIGS. 5b and 5c are schematic views showing the sliver of FIG. 5a of the circumferential weft stretching and elongating.
Figure 5C:
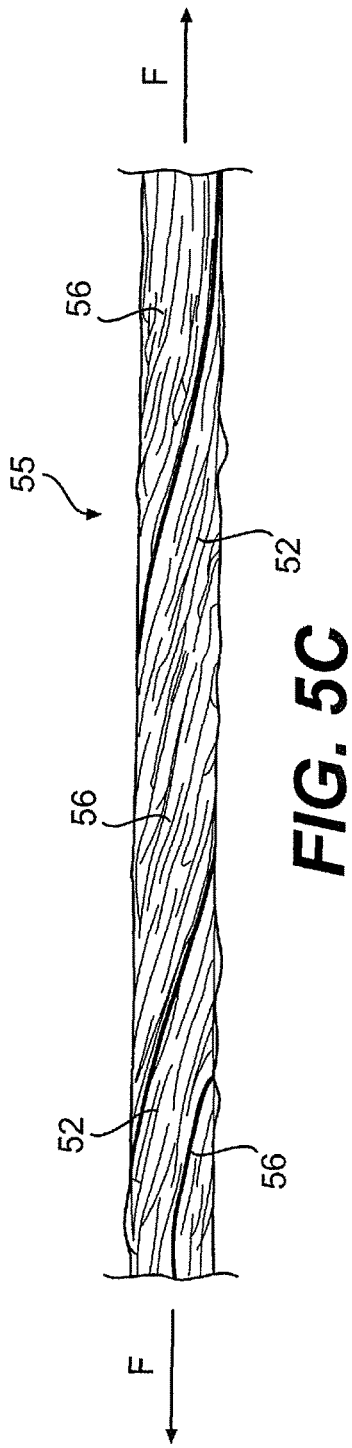

FIG. 1 is a schematic illustration of an example of a portion of an older network of underground pipes 10 in need of repair. The underground pipes 10 have an average diameter of 6 inches. The illustrated network of underground pipes 10 includes a first tee connection 12 connected above ground at its upper end 14 to a fire hydrant (not shown). A first pipe segment 16 of 6 inches Inside Diameter (ID) is connected to the first tee connection 12 via coupling 18 at a first end and to a second pipe segment 20 of 5½ inches ID via a second coupling 22. The second pipe segment 20 is connected to a second tee connection 24 via coupling 26 and the upper end 28 of the second tee connection 24 is also connected above ground to a fire hydrant (not shown). The ID of pipe segments is nominal and there are always small variations, either related to old pipe manufacturing tolerances or to different pipe types, i.e. cemented iron pipes, polyethylene (PE) or polyvinylchloride (PVC) pipes. The exact ID of the pipe segments to be repaired is known only once the ID is measured.

As illustrated, the first pipe segment 16 has sustained damage at its bottom end caused by an initial crack which expanded over time into a perforated crumbling cavity 30 through which water is leaking into the ground. The second pipe segment 20 also includes a damage bottom portion caused by excessive corrosion resulting into a perforated section 32 which is also leaking water into the ground. The second pipe segment 20 was replaced decades ago with a non-standard pipe segment having a 5½ inches ID by mistake instead of the required 6 inches ID.

The damages to the first and second pipe segments 16 and 20 are so extensive that the repair through the CIPP technique must also provide structural reinforcement of the network of underground pipes 10 otherwise the tubular liner installed will not be able to resist the normal wear and tear to which the network of underground pipes 10 is subjected to for a long time and the underground pipes 10 will have to be repaired again in a short time rendering the expenditure futile. Therefore a seamless tubular liner is best suited for this repair because seamless tubular textile jacket provides the most effective reinforcement for underground pipes.

Typically, these two pipe segments 16 and 20 of the illustrated network of underground pipes 10 would be repaired using a 6¼ inches Outside Diameter (OD) seamless tubular liner impregnated with a curable resin which is a quarter (¼) inch larger than the ID of the first pipe segment 16 in order to insure that seamless tubular liner will rest firmly against the inner wall of the damaged pipe segments 16 and 20 when cured in place. However, an OD which is a ¼ inch larger than the ID of the first pipe segment 16 will result in an excess of material of $\pi \times \frac{1}{4}$ inch or approximately ¾ inch. As previously described, the excess material resulting from the larger OD of the seamless tubular liner will result in the formation of a bulge or fold extending along the length of the pipe segments 16 and 20. As illustrated in FIG. 2 which is a cross-sectional view of an exemplary pipe segment 35 in which a seamless tubular liner 36 having larger OD than the ID of the pipe segment 35 was installed. As illustrated, the larger OD of the seamless tubular liner 36 resulted in the formation of a bulge or fold 37 which extends along the length of the pipe segment 35. The effective diameter of the underground pipe being repaired is thus further reduced by this bulge 37 and this bulge 37 also partially obstructs the dynamic flow of liquid in the pipe segment 35.

This problem is exacerbated in the network of underground pipes 10 as illustrated wherein the second pipe segment 20 has a smaller ID than the ID of the first pipe segment 16. The bulge created in the second pipe segment 20 will be even bigger that in the first pipe segment 16 and will further reduce the effective diameter of the underground pipe being repaired and further obstruct the dynamic flow of liquid in the network of underground pipes 10.

To alleviate the problem of variations of diameters in the network of underground pipes 10 resulting from damages to the pipe walls or from pipe segments of different ID connected together, a seamless tubular liner 40 was designed for manufacturing with an industrial circular weaving loom which has the ability to stretch radially to accommodate variations in the diameter of the network of pipes to be repaired, while providing structural rehabilitation to the host pipe in the circumferential direction once the curable resin impregnating the seamless tubular liner is fully cured.

As illustrated in FIG. 3 which illustrates schematically a portion of the seamless tubular liner 40, the seamless tubular liner 40 is a circular woven sheath (plain, twill, basket, satin, non-crimp structure, etc.) made of longitudinal warps 42 comprising filament yarns consisting of continuous filament fibers bundled together and extending along the length of the seamless tubular liner 40 and circumferential wefts 44 comprising a continuous sliver consisting of staple fibers bundled together to form a continuous strand adapted for weaving in an industrial circular weaving loom. More specifically, the continuous sliver of the circumferential wefts 44 consists of a plurality of short and medium length fibers bundled together to form a continuous and coherent yarn. The sliver has a tensile strength which is high enough to sustain the force exerted by an industrial circular weaving machine without breaking and with little or no deformation, and yet low enough to stretch by disentanglement of the strand of bundled staple fibers under the inflation pressure of the installation fluid when the seamless tubular liner is expanded inside the host pipe. The inflation pressure of the installation fluid varies typically between 20 and 35 psi when the seamless tubular liner is expanded inside the host pipe. Thus the continuous sliver has a maximum tensile strength of approximately 10 to 15 psi which is below the force exerted by an inflation pressure such that it will stretch once the inflation pressure is applied to the seamless tubular liner 40.

The sliver of the circumferential weft 44 may be made of staple polyester fibers, staple glass fibers, staple carbon or aramid fibers, staple natural fibers such as cellulosic fibers, like flax or hemp fibers, staple polyethylene fibers, polyamide fibers or polypropylene fibers.

With reference to FIG. 4a which illustrates a sliver 50 in accordance with a preferred embodiment of the invention consisting of staple fibers 52 tightly bundled together wherein the staple fibers 52 are drawn substantially parallel to each other to form a continuous strand. The circumferential weft 44 of the seamless tubular liner 40 is made of the sliver 50. When the inflation pressure of the installation fluid inside the seamless tubular liner reaches the yield strength of the sliver 50 of the circumferential wefts 44, the force F exerted on the sliver 50 begins to stretch and the staple fibers 52 start sliding relative to each other thereby disentangling the tight bundle of staple fibers 52 and larger gaps 54 emerge such that the sliver 50 starts elongating as illustrated in FIG. 4b. As the force F continues to pull on the sliver 50, the staple fibers 52 further slide relative to each other further disentangling the tight bundle of staple fibers 52, increasing the number and size of gaps 54 and the sliver 50 further elongates as illustrated in FIG. 4c. As the sliver 50 elongates, the diameter of the seamless tubular liner expands inside the host pipe in areas where the ID of the pipe segments permits such that the seamless tubular liner 40 rests firmly against the inner walls of the damaged pipe segments throughout the host pipe as the resin is cured in place. As illustrated in FIG. 4c, the elongation of the sliver 50 causes the staple fibers 52 to disentangle themselves and slide relative to each other, however a plurality of staple fibers 52 remain bundled and entangled together such that the sliver 50 remains a continuous strand that provide structural reinforcement to the host pipe once the resin is cured.

The sliver 50 may be comprised of staple glass fibers 52 having an average length of 4-8 inches (10-20 cm) or may be comprised of staple PET fibers 52 having an average length of 1-2 inches (2.5-5 cm), or a combination thereof.

With reference to FIG. 5a which illustrates a sliver 55 in accordance with a second embodiment of the invention consisting of staple fibers 52 twisted loosely together to form a continuous strand. The number of twist per inches is preferably between 1 and 3. The circumferential weft 44 of the seamless tubular liner 40 is made of the sliver 55. When the inflation pressure of the installation fluid inside the seamless tubular liner reaches the yield strength of the sliver 55 of the circumferential wefts 44, the force F exerted on the sliver 55 begins to unravel the twists 56 and the staple fibers 52 start to disentangle themselves and the sliver 55 elongates as illustrated in FIG. 4b. As the force F continues to pull on the sliver 55, the staple fibers 52 further disentangle themselves and the sliver 55 further elongates as illustrated in FIG. 4c. As the sliver 55 elongates, the diameter of the seamless tubular liner expands inside the host pipe in areas where the ID of the pipe segments permits such that the seamless tubular liner 40 rests firmly against the inner walls of the damaged pipe segments throughout the host pipe as the resin is cured in place. As illustrated in FIG. 4c, the elongation of the sliver 55 causes the staple fibers 52 to disentangle themselves and slide relative to each other and gaps 54 between the staple fibers 52 emerge, however a plurality of staple fibers 52 remain entangled together such that the sliver 55 remains a continuous strand that provide structural reinforcement to the host pipe once the resin is cured.

Figure 6:
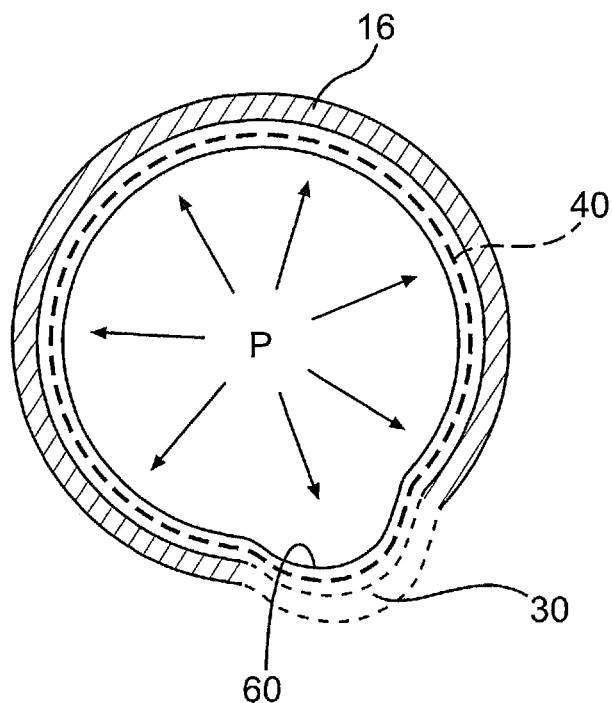
FIG. 6 is a schematic cross-sectional view of a pipe segment with the seamless tubular liner of FIG. 3 installed therein.

With reference to FIG. 6 which is a cross-sectional view of pipe segment 16 with the perforated crumbling cavity 30 through which water was leaking into the ground, the seamless tubular liner 40 was installed inside the pipe segment 16, pressurized and cured in place. As illustrated, the OD of the seamless tubular liner 40 has expanded to conform perfectly to the ID of the pipe segment 16 and further expanded in the area of the crumbling cavity 30 to fill in the cavity 30 such that the portion 60 of the seamless tubular liner 40 rests against the bottom of the cavity 30 instead of simply closing the cavity 30 and leaving the wall of the seamless tubular liner 40 unsupported which provides a much stronger structural reinforcement of the pipe segment 16. The sliver 50 or 55 of the circumferential wefts 44 of the seamless tubular liner 40 have stretched generally along the circumference of the pipe segment 16 and have further stretched locally in the area of the cavity 30 to fill in the cavity 30 and form a stronger structural reinforcement which rests on solid ground. Furthermore, the expansion of the diameter of the seamless tubular liner 40 ensure that there is no formation of a bulge or fold around the circumference of the host pipe as illustrated in FIG. 2.

The sliver 50 or 55 of the circumferential wefts 44 of the seamless tubular liner 40 has the ability to stretch through disentanglement such that the seamless tubular liner 40 can be stretched radially to accommodate variations in the diameter of the underground pipes and further stretched to fill in various cavities and perforations in the network of underground pipes to be repaired. As previously described, the sliver 50 or 55 stretches through disentanglement of its staple fibers 52, the sliver 50 or 55 remains a continuous strand that provide structural reinforcement to the host pipe once the resin is cured.

Figure 7:
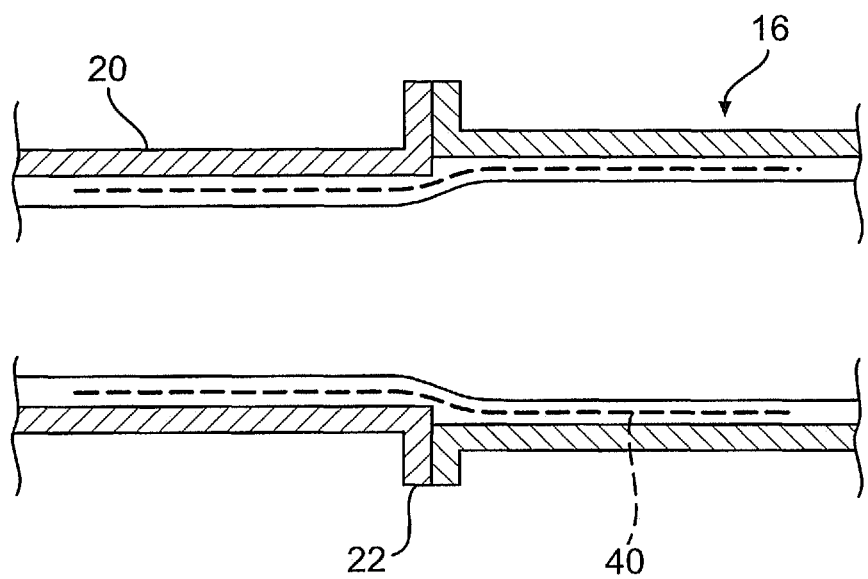
FIG. 7 is a schematic cross-sectional view of two abutting pipe segment with the seamless tubular liner of FIG. 3 installed therein.

This ability of sliver 50 or 55 of the circumferential wefts 44 of the seamless tubular liner 40 to stretch through disentanglement enables the seamless tubular liner 40 to rehabilitate a network of underground pipes comprising pipe segments of different diameters. As previously mentioned, the underground pipes 10 shown in FIG. 1 a first pipe segment 16 having a 6 inches ID connected to a second pipe segment 20 of 5½ inches ID. The novel seamless tubular liner 40 comprising circumferential wefts 44 adapted to stretch allows the use of a 5½ inches OD tubular liner to rehabilitate both pipe segments 16 and 20 having a 6 inches ID and a 5½ inches ID respectively. As illustrated in FIG. 7, the seamless tubular liner 40 was installed into the pipe segment 16, through the coupling 22, and into the pipe segment 20, then pressurized and cured in place. The diameter of the seamless tubular liner 40 has expanded to conform perfectly to the inside diameter of both pipe segment 16 and pipe segment 20 as the sliver 50 or 55 of the circumferential wefts 44 expanded more in the pipe segment 16 and less in the pipe segment 20. The tubular liner 40 is adapted to expand at different rates to accommodate pipe segments of different diameters such that a single tubular liner 40 can be used that conforms to different diameters of pipes as well as the transition from one diameter to the other through the coupling 22 and tubular liner 40 rests firmly against the walls of the pipe segments and the walls of the coupling itself thereby providing a strong structural reinforcement of the network of underground pipes 10.

The seamless tubular liner 40 impregnated with a curable resin is adapted for insertion into the network of underground pipes 10 without the need to excavate since the seamless tubular liner 40 remains flexible throughout the installation process and expansion process until its impregnated resin is fully cured in place inside the network of underground pipes 10, therefore providing structure to the host pipe.

The seamless tubular liner 40 preferably includes an internal liner consisting of an impervious water tight membrane such as a thermoplastic urethane (TPU) membrane or a plastic membrane which isolates the tubular liner 40 and its resin from the water flowing through the rehabilitated host pipe when the installation is completed.

The seamless tubular liner 40 may also be a double layer of circular woven sheaths both made of longitudinal warps 42 comprising filament yarns consisting of continuous filament fibers bundled together extending along the length of the seamless tubular liner 40 and circumferential wefts 44 comprising a continuous sliver 50 or 55 consisting of staple fibers bundled together thereby creating a stronger structural reinforcement of the host pipe.

The resin may be a curable thermosetting resin such as an epoxy resin, an unsaturated polyester resin, a vinyl ester resin, or a urethane based resin, either thermally cured or UV light cured to provide strength and stiffness to the seamless tubular liner, or a thermoplastic resin such as a polyolefin, a polyethylene, a polyethylene terephthalate (PET) or technical resin such as nylon, etc., in which case the resin needs to be substantially softened or molten using heat to allow for the circumferential wefts 44 comprising a continuous sliver 50 or 55 consisting of staple fibers bundled together to extend in the circumferential direction, after which it solidifies or crystallizes through cooling to provide strength and stiffness to the seamless tubular liner.

Once installed and solidified through curing (crosslinking) or crystallisation, the seamless tubular liner 40 conforms perfectly to the inside diameter of the various pipe segments and damaged or irregular areas of the network of underground pipes 10 and also provides a strong structural reinforcement of the network of underground pipes 10 including the various pipe couplings, including T and Y connections.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A seamless tubular liner for repairing a pipe in a cured in place pipe process, the tubular liner having a diameter and a length, the tubular liner comprising a circular woven sheath of longitudinal warps and circumferential wefts weaved in a circular weaving loom and impregnated with a curable resin, wherein:

said longitudinal warps comprise filament yarns consisting of continuous fibers extending along the length of the tubular liner; and said circumferential wefts comprise slivers consisting of fibers of different lengths bundled together to form a continuous strand; said slivers having a yield strength; wherein, when the circular woven sheath is subjected to an inflation pressure that reaches the yield strength of said slivers of the circumferential wefts, said slivers stretch radially causing a first part of the fibers of different lengths to disentangle themselves and slide relative to each other, a second part of the fibers of different lengths remaining bundled and entangled together into the continuous strand as the diameter of the tubular liner expands within pipe segments until stopped by inner walls of said pipe segments and providing structural reinforcement to the pipe once the resin is cured.

2. The seamless tubular liner as defined in claim 1 wherein the circular woven sheath is impregnated with a thermoplastic resin.

3. The seamless tubular liner as defined in claim 1 further comprising a second internal liner.

4. The seamless tubular liner as defined in claim 3 wherein the second internal liner is a circular woven sheath identical to the circular woven sheath defined in claim 1.

5. The seamless tubular liner as defined in claim 1, further comprising an internal liner consisting of a water tight membrane.

6. The seamless tubular liner as defined in claim 1 wherein the fibers of said wefts are selected with different lengths and bundled together substantially parallel to each other to form the continuous strand.

7. The seamless tubular liner as defined in claim 1 wherein the fibers of said wefts are selected with different lengths and bundled together with a twist to form the continuous strand.

8. The seamless tubular liner as defined in claim 1 wherein the fibers of said wefts are selected with different lengths and from the group consisting of polyester fibers, glass fibers, carbon or aramid fibers, natural fibers, cellulosic fibers, flax or hemp fibers, polyethylene fibers, polyamide fibers and polypropylene fibers.

\* \* \* \* \*